(12) United States Patent
Dockery

(10) Patent No.: US 6,638,423 B2
(45) Date of Patent: Oct. 28, 2003

(54) MULTIPLE STAGE FUEL STRAINER ASSEMBLY

(75) Inventor: Randall Lee Dockery, Flushing, MI (US)

(73) Assignee: Delphi Technologies, Inc., Troy, MI (US)

(*) Notice: Subject to any disclaimer, the term of this patent is extended or adjusted under 35 U.S.C. 154(b) by 32 days.

(21) Appl. No.: 09/947,988

(22) Filed: Sep. 6, 2001

(65) Prior Publication Data
US 2003/0042185 A1 Mar. 6, 2003

(51) Int. Cl.[7] .............................................. B01D 35/147
(52) U.S. Cl. ..................... 210/132; 210/172; 210/315; 210/342; 210/416.4; 210/461; 210/486
(58) Field of Search ................................ 210/130, 132, 210/172, 315, 335, 342, 416.4, 461, 486, 499

(56) References Cited

U.S. PATENT DOCUMENTS

| | | | | |
|---|---|---|---|---|
| 2,285,997 A | * | 6/1942 | Mino | 210/132 |
| 2,998,138 A | * | 8/1961 | Mould et al. | 210/90 |
| 5,084,166 A | * | 1/1992 | Shiraga et al. | 210/172 |
| 5,130,014 A | * | 7/1992 | Volz | 210/130 |
| 5,195,494 A | * | 3/1993 | Tuckey | 123/514 |
| 5,415,146 A | * | 5/1995 | Tuckey | 123/509 |
| 5,665,229 A | * | 9/1997 | Fitzpatrick et al. | 210/232 |
| 5,728,292 A | * | 3/1998 | Hashimoto et al. | 210/136 |

FOREIGN PATENT DOCUMENTS

| | | | | |
|---|---|---|---|---|
| FR | 1088616 | * | 3/1955 | 210/486 |
| JP | 2078408 | * | 3/1990 | 210/132 |

* cited by examiner

Primary Examiner—Matthew O. Savage
(74) Attorney, Agent, or Firm—Jimmy L. Funke

(57) ABSTRACT

A multiple stage fuel strainer assembly for a fuel tank in a vehicle includes a strainer adapted to be connected to an inlet of a fuel pump disposed in the fuel tank. The multiple stage fuel strainer assembly also includes a valve connected to the strainer to allow fuel to flow through the strainer to the inlet when an external surface of the strainer is restricted with contaminants in the fuel.

18 Claims, 1 Drawing Sheet

MULTIPLE STAGE FUEL STRAINER ASSEMBLY

TECHNICAL FIELD

The present invention relates generally to fuel tanks for vehicles and, more particularly, to a multiple stage fuel strainer assembly for a fuel tank of a vehicle.

BACKGROUND OF THE INVENTION

It is known to provide a fuel tank for a fuel system in a vehicle to hold fuel to be used by an engine of the vehicle. In some vehicles, a fuel strainer is provided to filter a certain degree of contaminants in the fuel. These strainers are constructed from either a woven or non-woven media and their particle retention level ranges from thirty (30) microns to eighty (80) microns. The contaminants range in the form of dirt and metal particles, water, and air (vapor). Typically, the fuel strainer is located at a bottom of the fuel tank and attached to an inlet of a fuel pump to filter the contaminants from the fuel before the fuel enters the fuel pump. However, large and heavy contaminants in the fuel are normally found at the bottom of the fuel tank. When too many contaminants gather on or in the fuel strainer, the fuel restrainer becomes restrictive and may eventually even plug up. When this happens, the fuel pump cannot pull enough fuel through the media of the fuel strainer, causing a failure of the fuel pump. In addition, when the fuel strainer becomes restrictive, the fuel system experiences reduced pressure caused by vapor lock cavitation during hot fuel conditions. This typically results in a fuel sender or module reservoir assembly being replaced and not the fuel strainer itself.

One attempt to reduce the restriction of the fuel strainer is by adding additional surface area. However, adding additional surface area normally means increasing the size and shape of the fuel strainer. The problem with most vehicle applications is finding additional space to increase the size of the fuel strainer. Further, more vehicle specifications are requiring longer strainer life.

Therefore, it is desirable to provide a fuel strainer for a fuel tank in a vehicle that has multiple stages to strain fuel. It is also desirable to provide a fuel strainer for a fuel tank in a vehicle that has the ability to filter fuel for a longer period of time without increasing the overall length or width of the fuel strainer. It is further desirable to provide a fuel strainer for a fuel tank in a vehicle that reduces restriction of the fuel strainer.

SUMMARY OF THE INVENTION

It is, therefore, one object of the present invention to provide a multiple stage fuel strainer assembly for a fuel tank in a vehicle.

It is another object of the present invention to provide a multiple stage fuel strainer assembly for a fuel tank in a vehicle that reduces fuel strainer restriction and allows a fuel strainer to strain fuel for a longer period of time.

To achieve the foregoing objects, the present invention is a multiple stage fuel strainer assembly for a fuel tank in a vehicle including a strainer adapted to be connected to an inlet of a fuel pump disposed in the fuel tank. The multiple stage fuel strainer assembly also includes a strainer adapted to be connected to an inlet of a fuel pump disposed in the fuel tank. The multiple stage fuel strainer assembly further includes a valve connected to the strainer to allow fuel to flow through the strainer to the inlet when an external surface of the strainer is restricted with contaminants in the fuel.

One advantage of the present invention is that a multiple stage fuel strainer assembly is provided for a fuel tank in a vehicle. Another advantage of the present invention is that the multiple stage fuel strainer assembly has the ability to filter fuel for a longer period of time. Yet another advantage of the present invention is that the multiple stage fuel strainer assembly has a longer strainer life through increased surface area without increasing the overall length or width of the fuel strainer. Still another advantage of the present invention is that the multiple stage fuel strainer assembly improves performance during hot fuel conditions due to the increased surface area. A further advantage of the present invention is that the multiple stage fuel strainer assembly improves the quality of the fuel system by reducing fuel strainer restriction when current strainers become plugged, thereby reducing the chance of a restricted fuel strainer causing fuel pump failure.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT

Figure 1:
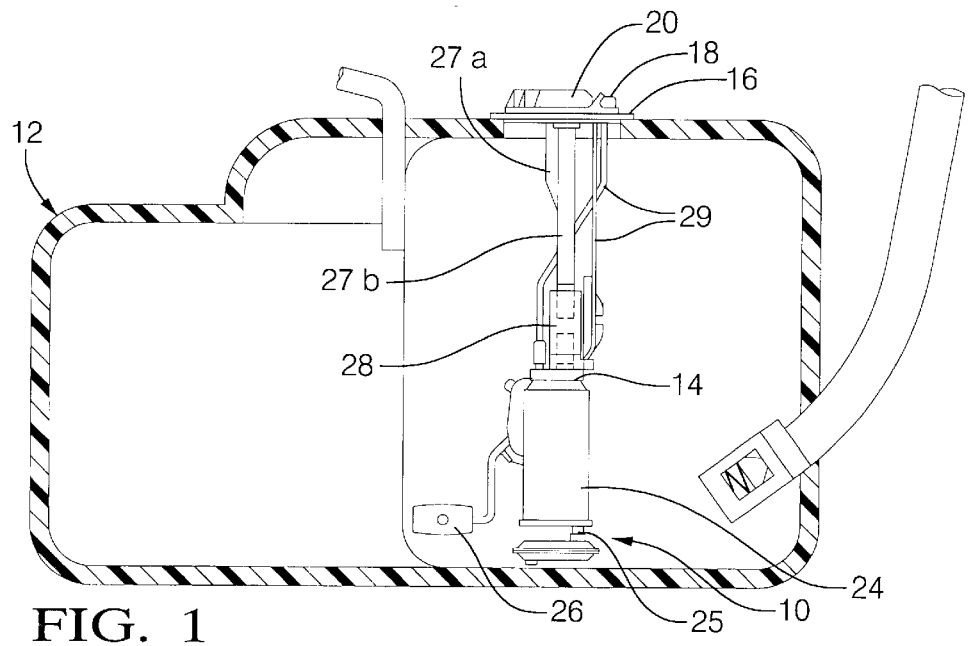
FIG. 1 is a fragmentary elevational view of a multiple stage fuel strainer assembly, according to the present invention, illustrated in operational relationship with a fuel tank of a vehicle.
Figure 2:
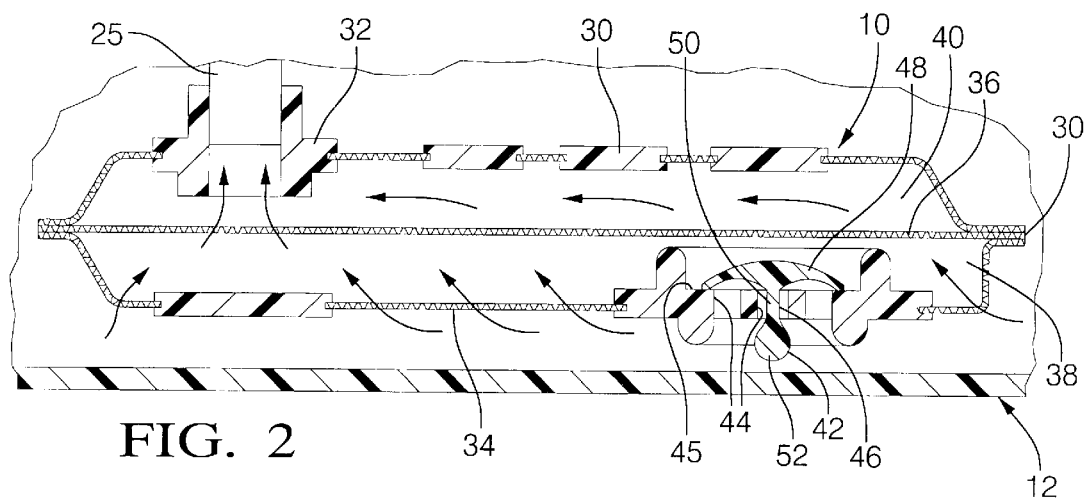
FIG. 2 is a fragmentary elevational view of the multiple stage fuel strainer assembly of FIG. 1 illustrated in a first operational state.

Referring to the drawings and in particular FIGS. 1 and 2, one embodiment of a multiple stage fuel strainer assembly 10, according to the present invention, is shown for a fuel tank, generally indicated at 12, in a vehicle (not shown). The fuel tank 12 includes a fuel sending unit 14 disposed therein having a removable cover 16 sealed to the top of the fuel tank 12 with an electrical connector 18 and a fuel line connector 20. The fuel-sending unit 14 also includes an electrical fuel pump 24 with an inlet 25 at a bottom thereof and a float gage 26 to indicate fuel level. The fuel-sending unit 14 includes a return tube 27a and a fuel tube 27b connected to the fuel line connector 20 and the fuel pump 24 by a coupler 28. The fuel-sending unit 14 also includes electrical wires 29 interconnecting the electrical connector 18 and the fuel pump 24. The multiple stage fuel strainer assembly 10 is connected to the inlet 25 of the fuel pump 24 and is positioned close to a bottom of the fuel tank 12. The fuel tank 12 is formed of a metal material or plastic material. It should be appreciated that the multiple stage fuel strainer assembly 10 may connected to a fuel module (not shown). It should also be appreciated that, except for the multiple stage fuel strainer assembly 10, the fuel tank 12 and fuel-sending unit 14 are conventional and known in the art.

Referring to FIGS. 1 and 2, the multiple stage fuel strainer assembly 10 includes a fuel strainer 30 extending longitudinally. The strainer 30 is generally rectangular in shape, but may be any suitable shape. The strainer 30 has a connector 32 connected to the inlet 25 of the fuel pump 24. The connector 32 is made of a rigid material such as plastic nylon or acetal. The strainer 30 includes an external or fine filtration member 34 connected to the connector 32. The external filtration member 34 is fabricated from a woven or non-woven filtering material, preferably nylon, to allow fuel to pass therethrough to the fuel pump 24, but prevent certain contaminants from passing therethrough to the fuel pump 24. The external filtration member 34 has a particle retention rating of approximately thirty (30) microns to approximately eighty (80) microns. The external filtration member 34 may be one or more layers, preferably a top and bottom layer, molded to the connector 32 by conventional means such as plastic injection molding. It should be appreciated that the external filtration member 34 acts as a conventional fuel strainer.

The strainer 30 also includes an internal or less restrictive filtration member 36. The coarse filtration member 36 is fabricated with a possibly larger micron size and less restrictive woven or non-woven filtering material, preferably nylon, than the external filtration member 34 to allow fuel to pass therethrough to the fuel pump 24, but prevent certain contaminants from passing therethrough to the fuel pump 24. The internal filtration member 36 has a particle retention rating of approximately thirty (30) microns to approximately eighty (80) microns. The internal filtration member 36 is fastened between top and bottom layers of the external filtration member 34, dividing the strainer 30 in two halves, which creates two chambers 38 and 40. It should be appreciated that the internal filtration member 36 has a micron size large enough where certain types of soap, slime, or gelatinous contaminants in fuel does not plug the member 36.

The multiple stage fuel strainer assembly 10 has a valve 42 connected to either the longitudinal end or underside of the strainer 30. The valve 42 is of a by-pass type. The valve 42 has a valve housing 45 molded to the strainer 30. The valve 42 has at least one, preferably a plurality of apertures 44 extending axially through the valve housing 45 for fluid flow. The valve 42 also has a valve member 46 disposed in a central one of the apertures 44 and movable relative thereto. The valve member 46 has a head 48 to open and close the apertures 44 and a shaft 50 extending axially from the head 48 and through the one aperture 44 and a flange 52 at one end of the shaft 50 to prevent the shaft 50 from exiting the aperture 44. The head 48 has a generally circular umbrella shape, the shaft 50 has a generally cylindrical shape, and the flange 52 has a generally spherical shape. The valve member 46 is made of a flexible material such as an elastomeric or plastic material. It should be appreciated that the valve 42 will open when a predetermined vacuum such as approximately 3.0 kPa. to approximately 3.5 kPa. is reached. It should also be appreciated that the valve 42 opens only when the external filtration member 34 is restricted or plugged by contaminants in the fuel to direct fuel to the internal filtration member 36.

In operation, the multiple stage fuel strainer assembly 10 is illustrated in a first operational state in FIG. 2 in which the strainer 30 is positioned near a bottom of the fuel tank 12. A first stage of the multiple stage fuel strainer assembly 10 strains or filters fuel through the external filtration member 34 as indicated by the arrows in FIG. 2. The fuel flows through the external filtration member 34 into the first chamber 38 and through the internal filtration member 36 into the second chamber 40, in turn, to the inlet 25 of the fuel pump 24 as indicated by the arrows in FIG. 2.

Figure 3:
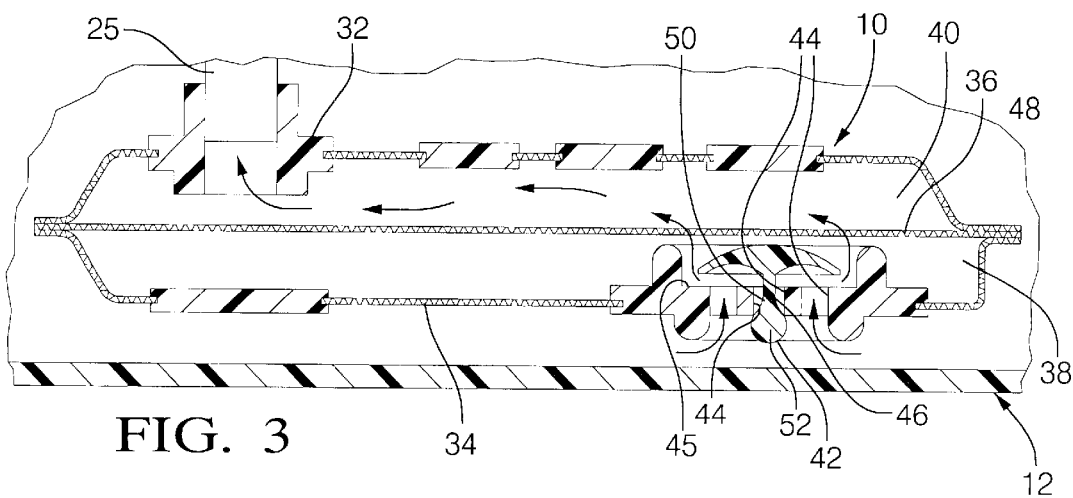
FIG. 3 is a view similar to FIG. 2 illustrating the multiple stage fuel strainer assembly in a second operational state.

As the external filtration member 34 loads up with particle contamination, the valve 42 opens and fuel is routed to the second stage of the multiple stage fuel strainer assembly 10. The fuel enters through the apertures 44 to the first chamber 38. The internal filtration member 36 filters the fuel from the first chamber 38 and the fuel flows to the second chamber 40, in turn, to the inlet 25 of the fuel pump 24 as indicated by the arrows in FIG. 3. As a result, the strainer 30 continues straining fuel for the fuel pump 24, increasing its life by capturing more contamination. This increases the life of the complete fuel-sending unit 14 by continuing straining additional contaminants, such as larger dirt and metal particles, normally found at the bottom of the fuel tank 12. It should be appreciated that the internal filtration member 36 operates effectively only when the valve 42 opens and fresh fuel is drawn into the second chamber 40. It should also be appreciated that, until the valve 42 opens, the strainer 30 will operate as normal.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A multiple stage fuel strainer assembly for a fuel tank in a vehicle comprising:

a strainer adapted to be connected to an inlet of a fuel pump disposed in the fuel tank, said strainer comprising an external filtration member and an internal filtration member disposed within said external filtration member; and a valve connected to said external filtration member of said strainer to allow fuel to flow through said strainer to the inlet when an external surface of said external filtration member is restricted with contaminants in the fuel and a predetermined vacuum within said external filtration member is reached.

2. A multiple stage fuel strainer assembly as set forth in claim 1 wherein said strainer extends longitudinally.

3. A multiple stage fuel strainer assembly as set forth in claim 2 wherein said strainer has a longitudinal end adapted to be connected to the inlet.

4. A multiple stage fuel strainer assembly as set forth in claim 1 wherein said strainer is generally rectangular in shape.

5. A multiple stage fuel strainer assembly as set forth in claim 1 wherein said external filtration member is made of a fine filtration material having a pore size of approximately thirty (30) microns to approximately eighty (80) microns.

6. A multiple stage fuel strainer assembly as set forth in claim 5 wherein said internal filtration member is made of a less restrictive filtration material having a pore size greater or equal to said fine filtration material.

7. A multiple stage fuel strainer assembly as set forth in claim 1 wherein said valve is a by-pass valve.

8. A multiple stage fuel strainer assembly as set forth in claim 1 wherein said valve comprises a valve housing and a valve member cooperating with said valve housing.

9. A multiple stage fuel strainer assembly as set forth in claim 8 wherein said valve member has a head extending radially to cooperate with said valve housing.

10. A multiple stage fuel strainer assembly as set forth in claim 1 wherein said strainer includes a connector for connection to the inlet of the fuel pump.

11. A multiple stage fuel strainer assembly for a fuel tank in a vehicle comprising:

a strainer extending longitudinally between a first longitudinal end and a second longitudinal end, said first longitudinal end being adapted to be connected to an inlet of a fuel pump disposed in the fuel tank, said strainer comprising an external filtration member and an internal filtration member disposed within said external filtration member; and a valve connected to said external filtration member of said strainer to allow fuel to flow through said strainer to the inlet when an external surface of said external filtration member is restricted with contaminants in the fuel and a predetermined vacuum within said external filtration member is reached.

12. A multiple stage fuel strainer assembly as set forth in claim 11 wherein said external filtration member is made of a fine filtration material having a pore size of approximately thirty (30) microns to approximately eighty (80) microns.

13. A multiple stage fuel strainer assembly as set forth in claim 11 wherein said internal filtration member is made of a less restrictive filtration material having a pore size greater or equal to said fine filtration material.

14. A multiple stage fuel strainer assembly as set forth in claim 11 wherein said valve is a by-pass valve.

15. A multiple stage fuel strainer assembly as set forth in claim 11 wherein said valve comprises a valve housing and a valve member cooperating with said valve housing.

16. A multiple stage fuel strainer assembly as set forth in claim 15 wherein said valve member has a head extending radially to cooperate with said valve housing.

17. A multiple stage fuel strainer assembly as set forth in claim 11 wherein said strainer includes a connector connected to said external filtration member for connection to the inlet of the fuel pump.

18. A fuel tank assembly for a vehicle comprising:

a fuel tank;

a fuel pump disposed in said fuel tank;

a multiple stage fuel strainer operatively connected to an inlet of said fuel pump; and said multiple stage fuel strainer assembly comprising a strainer extending longitudinally between a first longitudinal end and a second longitudinal end, said first longitudinal end being connected to the inlet of said fuel pump, said strainer comprising an external filtration member and an internal filtration member disposed within said external filtration member; and a valve connected to said external filtration member of said strainer to allow fuel to flow through said strainer to the inlet when an external surface of said external filtration member is restricted with contaminants in the fuel and a predetermined vacuum within said external filtration member is reached.

* * * * *